J. Edson,
Hose Coupling.
No. 101,841.   Patented Apr. 12, 1870.
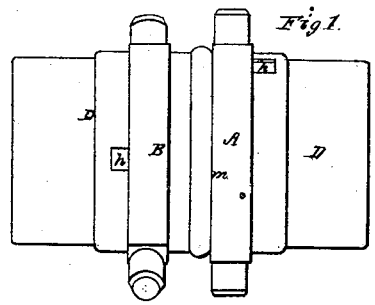
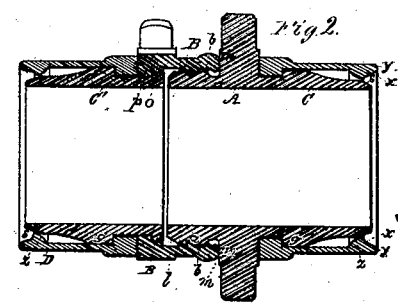
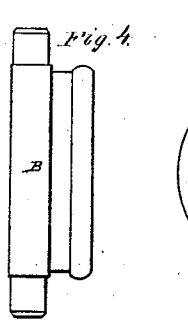
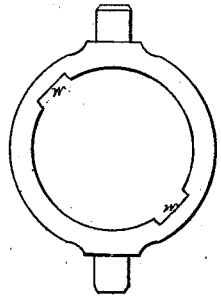
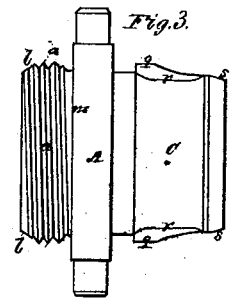
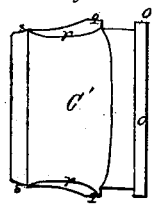
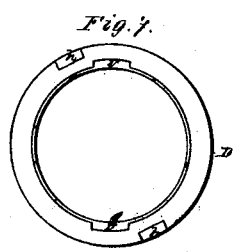
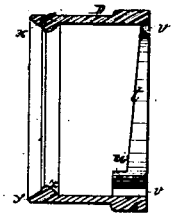
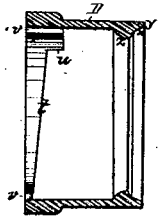
Witnesses
S. N. Piper.
L. N. Mölleu
Jacob Edson.
by his attorney.
R. H. Eddy.

ns may come:
United States Patent Office.

JACOB EDSON, OF BOSTON, MASSACHUSETTS.

Letters Patent No. 101,841, dated April 12, 1870.

IMPROVEMENT IN HOSE-COUPLINGS.

The Schedule referred to in these Letters Patent and making part of the same

*To all persons to whom these presents may come:*

Be it known that I, JACOB EDSON, of Boston, of the county of Suffolk and State of Massachusetts, have made a new and useful invention having reference to Hose-Couplings; and do hereby declare the same to be fully described in the following specification, and represented in the accompanying drawings, of which—

Figure 1 is a front elevation; and

Figure 2, a longitudinal section of one of my improved hose-couplings.

Figure 3 is a side view of the male-screw connection, with its attached neck.

Figure 4, a side view; and

Figure 5, a rear elevation of the female-screw connection of the coupling.

Figure 6 is a side view of its separate neck.

Figure 7 is a rear end view of one of the collars.

Figures 8 and 9 are transverse sections of it, showing the bayonet-catch cams in the opposite halves of the neck.

In the drawings the said male and female-screw connections are represented at A and B, that marked A having a male screw, $a$, to screw into a corresponding female screw, $b$, formed in the connection B, the same being as in various other well-known hose-couplings.

In such other couplings, however, the thread of the screw, at or near the extreme end of the screw, is very liable to become bent, marred, or indented when the screw is thrown down or falls upon a pavement, as it frequently happens after the parts of a hose may have been uncoupled. From such an accident the male screw becomes sometimes so bruised or injured as to render it very difficult, if not impossible, to couple it with its female screw.

In order to prevent such an accident to the male screw $a$, I provide it with a short conic frustum, $b$, extending from it, and with respect to the shoulder $m$ of it, in manner as represented in the drawings. This conic frustum and the periphery of the shoulder will generally strike the ground when the screw connection may fall thereon, and they will operate to keep the screw-thread out of contact therewith, and thus prevent it from injury, as set forth. Besides this, the frustum renders it easier to enter the male screw into the female screw.

The male-screw connection A, I provide with a tubular neck, $C$, formed in one piece with and so as to extend from the connection in manner as shown in the drawings.

The tubular neck C' of the other or female-screw connection B is a tube separate from the nut or connection B, and extends into and from it in manner as shown.

The part B turns freely on the part C', and they are provided with lapping shoulders $o\ p$, to keep them together.

Furthermore, each of the necks C C' is provided with two studs or projections, $g\ g$, which constitute parts of a "bayonet catch" for connecting a clamping ring or collar, D, to the neck.

Each of the necks is hollowed or concave on its outer surface, as shown at $r\ r$, and at its end is tapering or conical, as represented at $s$.

Each of the collars has two inclined helical planes or cams, $t\ t$, projecting at its larger end from its inner surface, such cams terminating at their upper ends against shoulders $u\ u$ and at their lower extremities against notches or passages $v\ v$ made in the collar, the whole being arranged as represented. These notches are to enable the projections $g\ g$ to be passed into the collar with the neck and up the inclined planes of the bayonet catches, when the collar is turned in the proper direction on the neck. The cams, with the projections and notches, constitute what is termed a "bayonet catch," but the cams when in use operate, also, to draw the collar endwise upon the neck and up to the shoulder from which the neck is extended.

The object of the bayonet catch and the cams is to dispense with screws as commonly employed for joining the collar and neck, and to obtain a readier and better fastening for the two.

The female-screw connection B is provided with notches $w\ w$, made or arranged on it in manner as represented, such being to enable the bayonet-studs or projections $g\ g$ of the neck to be passed through the said part B, for the purpose of either coupling the said part B and the neck together or separating them, as occasion may require.

Each of the collars I form at its outer end with a conical annular recess, $x\ x$, and a rounded edge, as shown at $y\ y$. Also, with a reversed rounded cone, $z$, arranged in the collar in manner and with respect to the tapering end of the neck, as shown in the drawings. The conical annular recess and the rounded edge serve to prevent the hose from being worn or cut by the outer end of the collar when such is formed in the ordinary way, as represented in the drawings of Letters Patent No. 87,554.

Preparatory to the fixation of a hose to either of the connections A B, that end of the hose which is to be attached to such part of the coupling should be passed through one of the clamping collars, after which the neck of the connection should be inserted in such end. Next, the collar should be moved up so as to interlock the parts of the bayonet-catch or catches, and should be revolved so as to clamp the hose firmly upon the neck with a tight joint.

To enable the collar to be set up by a spanner applied to it, I form it with a series of apertures, $h$, arranged in it at equal distances apart, and in other respects as represented in the drawings.

I herein make no claim to anything described or referred to in Letters Patent 24,179, 36,410, or 87,554.

What I claim in the above-specified hose-coupling as of my present invention may be stated as follows:

Each connection-neck C or C' and its collar D, as made or provided with the helical cams $t\ t$, the shoulders $u\ u$, the passages $v\ v$, and the bayonet-studs $g\ g$, arranged as set forth.

Also, the collar D, as made or provided with the conical annular recess $x\ x$ and the rounded edge $y\ y$, arranged together and with respect to the collar, and for the purpose in manner substantially as described.

Also, the connection B, as provided with the notches $w\ w$, for the passage through it of the projections of the bayonet-catches of the neck.

JACOB EDSON.

Witnesses:
R. H. EDDY,
J. R. SNOW.